US008171809B2

(12) United States Patent  (10) Patent No.: US 8,171,809 B2
Fritz  (45) Date of Patent: May 8, 2012

(54) SYSTEM AND METHOD FOR WIND TURBINE INSPECTION

(75) Inventor: Peter James Fritz, Greenville, SC (US)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 12/823,525

(22) Filed: Jun. 25, 2010

(65) Prior Publication Data

US 2011/0138937 A1  Jun. 16, 2011

(51) Int. Cl.
*G01N 19/00* (2006.01)
(52) U.S. Cl. ............................................ 73/865.8
(58) Field of Classification Search .................. None
See application file for complete search history.

(56) References Cited

U.S. PATENT DOCUMENTS

| | | | | |
|---|---|---|---|---|
| 4,311,434 | A | * | 1/1982 | Abe .......................... 416/142 |
| 4,848,168 | A | * | 7/1989 | Negishi ........................ 73/865.8 |
| 6,964,312 | B2 | | 11/2005 | Maggio |
| 2002/0084142 | A1 | * | 7/2002 | Brennan et al. .............. 182/133 |
| 2002/0171247 | A1 | * | 11/2002 | Willis et al. ................. 290/55 |
| 2006/0175465 | A1 | * | 8/2006 | Teichert ...................... 244/33 |
| 2008/0141778 | A1 | * | 6/2008 | Bosselmann et al. .......... 73/633 |
| 2010/0263448 | A1 | * | 10/2010 | Hughes et al. ................. 73/577 |

FOREIGN PATENT DOCUMENTS

WO  2007/085265  * 2/2007

OTHER PUBLICATIONS

Kim et al., "A Wall Climbing Robot with Vacuum Caterpillar Wheel System Operated by Mechanical Valve", Proceedings of the 9*th* International Conference on Climbing and Walking Robots, Sep. 2006, Brussels, Belgium.
International Climbing Machines Brochure, 2007, Ithaca, New York.

* cited by examiner

*Primary Examiner* — Robert R Raevis
(74) *Attorney, Agent, or Firm* — Dority & Manning, P.A.

(57) ABSTRACT

A system and method for inspecting a wind turbine for indications is disclosed. The method includes providing an inspection system on a tower of the wind turbine, the inspection system including a climbing device and an inspection device, the climbing device including a traction apparatus configured to engage the tower and a drive mechanism configured to drive the climbing device. The method further includes rotating a rotor blade of the wind turbine such that the rotor blade is approximately parallel to and proximate the tower, operating the inspection system to traverse the tower, and operating the inspection system to inspect the rotor blade for indications.

20 Claims, 3 Drawing Sheets

SYSTEM AND METHOD FOR WIND TURBINE INSPECTION

FIELD OF THE INVENTION

The present disclosure relates in general to wind turbines, and more particularly to systems and methods for inspecting wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The inspection of wind turbines, specifically of wind turbine rotor blades, is critical to the ongoing operation of wind turbines. Current systems and methods for inspecting wind turbines involve the use of telescopes to manually inspect the wind turbine rotor blades for cracks, erosion, fouling, or other potential defects, known as indications. Typically, an inspector will set up a telescope a certain distance from a wind turbine, and will manually use the telescope to visually inspect the wind turbine rotor blades for indications. This inspection process has a variety of disadvantages. For example, manually inspecting rotor blades from a distance subjects the process to human error, i.e., the inspector may fail to detect an indication, or the inspector may become disoriented while inspecting the rotor blades and provide inaccurate information. Further, the manual inspection of rotor blades may only be performed during optimal environmental conditions. For example, a manual inspection of a wind turbine may not be performed during the night or when the weather is cloudy, rainy, or otherwise dissatisfactory, and may only be performed during daylight when there is proper incident light, rather than glare or shade. Thus, current systems and methods for wind turbine inspection are relatively inaccurate, slow, and inefficient.

Accordingly, there is a need for a system and method for inspection of a wind turbine that eliminates or reduces associated human errors. Additionally, an inspection system and method that can perform in a wide variety of environmental conditions would be desired. Further, there is a need for a system and method for inspection of a wind turbine that are relatively fast and efficient.

BRIEF DESCRIPTION OF THE INVENTION

Aspects and advantages of the invention will be set forth in part in the following description, or may be obvious from the description, or may be learned through practice of the invention.

In one embodiment, a method for inspecting a wind turbine for indications is disclosed. The method includes providing an inspection system on a tower of the wind turbine, the inspection system including a climbing device and an inspection device, the climbing device including a traction apparatus configured to engage the tower and a drive mechanism configured to drive the climbing device. The method further includes rotating a rotor blade of the wind turbine such that the rotor blade is approximately parallel to and proximate the tower, operating the inspection system to traverse the tower, and operating the inspection system to inspect the rotor blade for indications.

In another embodiment, an inspection system for inspecting a wind turbine for indications is disclosed. The inspection system includes a climbing device configured to traverse a tower of the wind turbine, the climbing device including a traction apparatus configured to engage the tower and a drive mechanism configured to drive the climbing device. The inspection system further includes an inspection device connected to the climbing device and configured to inspect a rotor blade of the wind turbine for indications.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
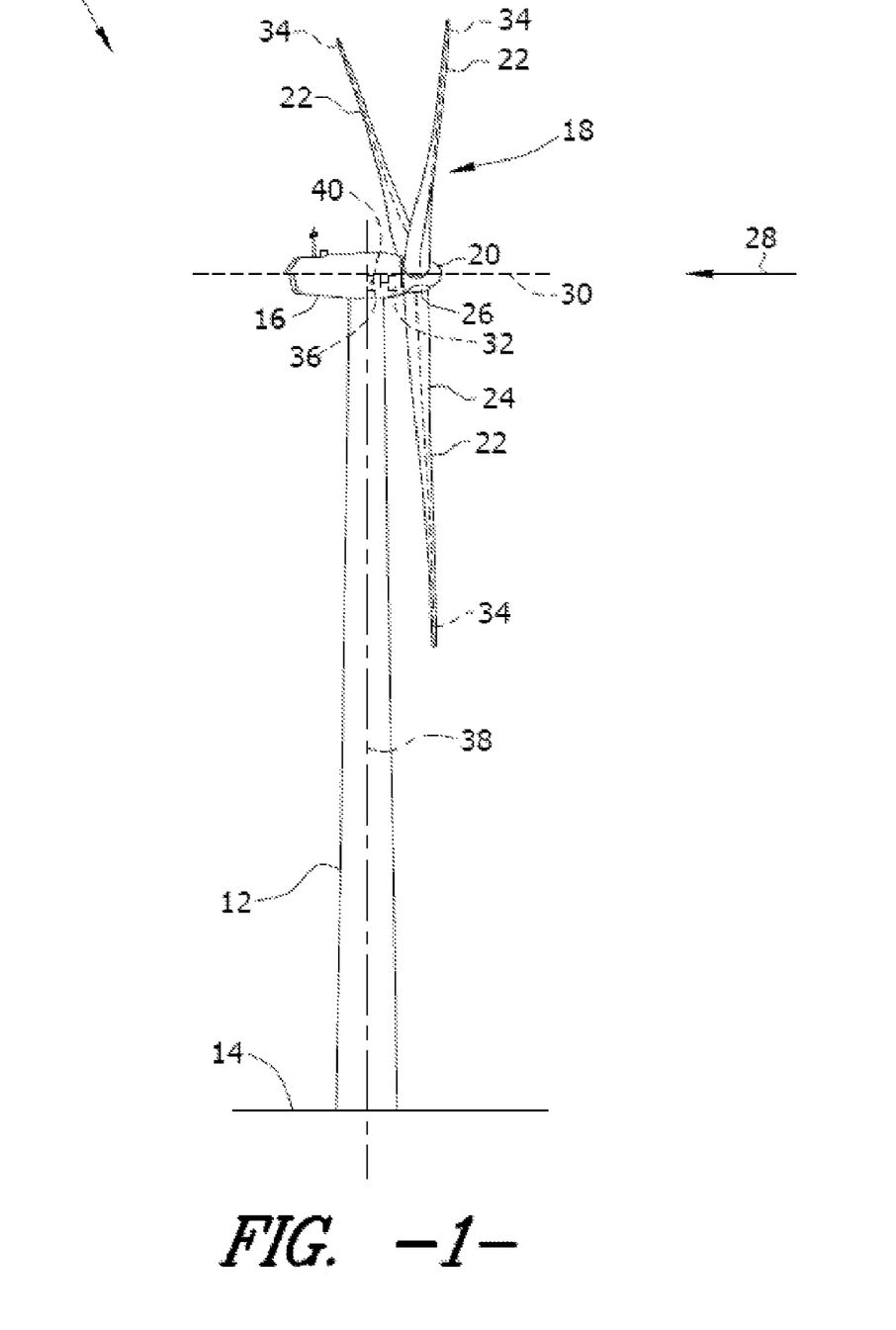
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, such as the ground or a platform or foundation, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26. In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 in or less, 20 m, 37 in, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

The wind turbine 10 of the present disclosure may, during fabrication, assembly, operation, or otherwise, incur various indications 50. An indication 50 may be, for example, a crack, erosion, fouling, or other defect in the wind turbine 10, such as in a rotor blade 22, tower 12, or other component of the wind turbine 10. The indications 50, if not recognized and repaired, may damage the various components of the wind turbine 10 or cause them to fail. For example, indications 50 in high load areas of the rotor blades 22 may, in some instances, need to be repaired before growing past approximately 50 millimeters ("mm") in length, while indications 50 in low load areas of the rotor blades 22 may need to be repaired before growing past approximately 3 meters ("m") in length.

Figure 2:
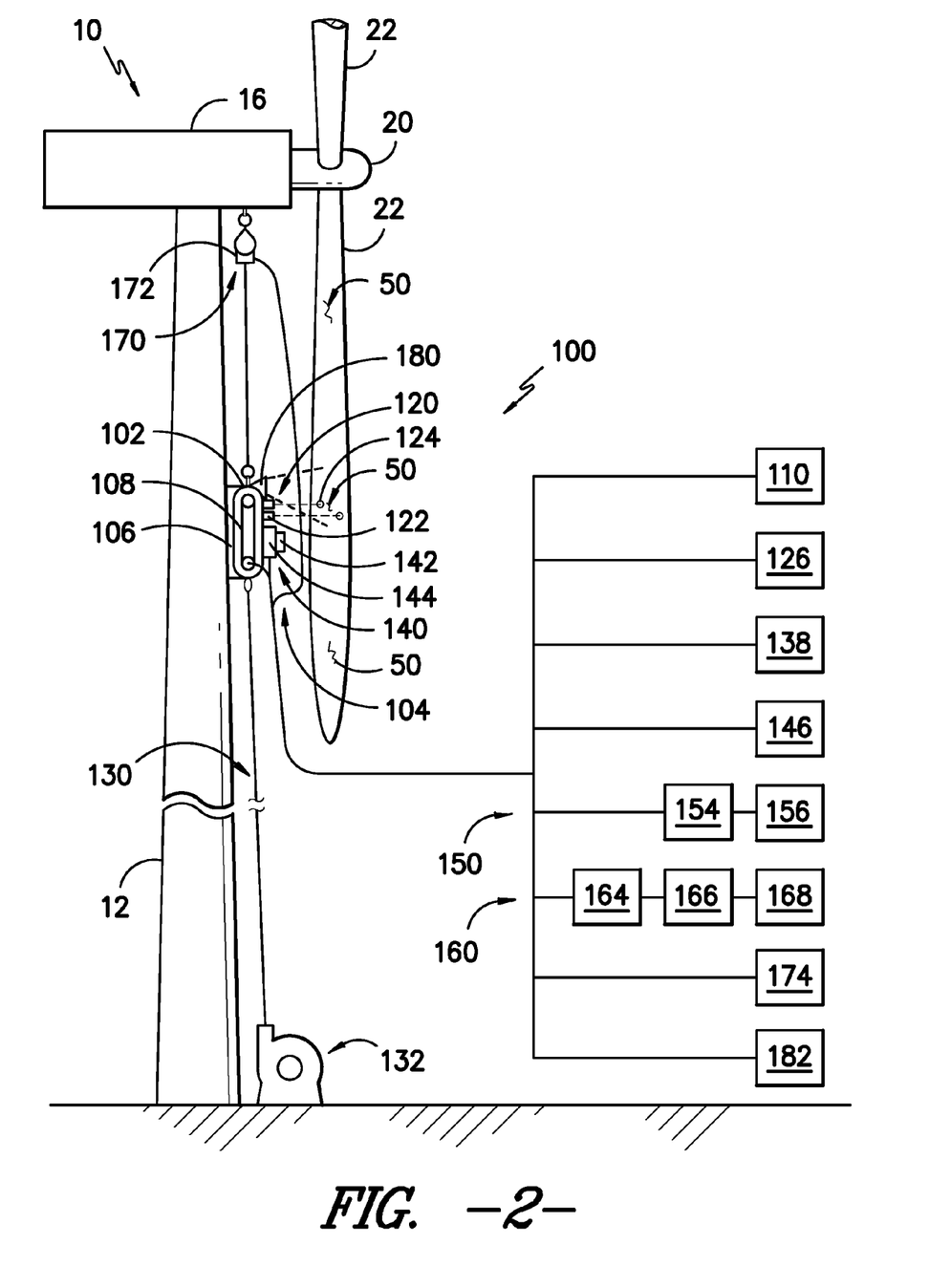
FIG. 2 is a side view of one embodiment of the inspection system of the present disclosure.
Figure 3:
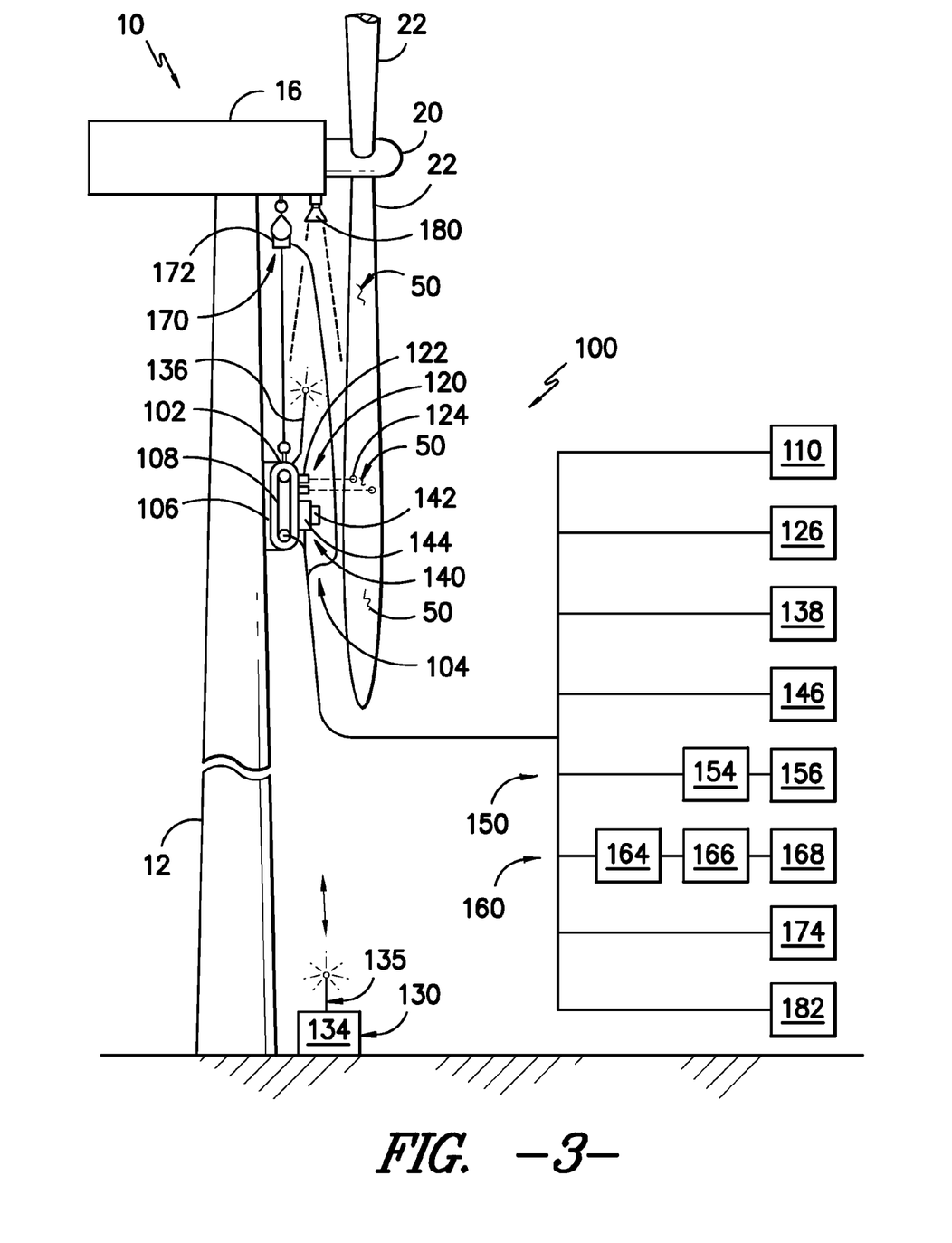
FIG. 3 is a side view of another embodiment of the inspection system of the present disclosure.

Thus, referring now to FIGS. 2 and 3, an inspection system 100 may be provided for inspecting the wind turbine 10 for indications 50. For example, the inspection system 100 may include a climbing device 102 and an inspection device 104. The inspection system 100 may perform a variety of tasks to provide fast, efficient, accurate inspection of the wind turbine 10.

The climbing device 102 may be configured to traverse the wind turbine 10. For example, in one embodiment, the climbing device 102 may be configured to traverse the tower 12 of the wind turbine 10. Alternatively, the climbing device 102 may be configured to traverse the rotor blades 22 or any other components of the wind turbine 10. The climbing device 102 may include a traction apparatus 106. The traction apparatus 106 may be configured to engage the wind turbine 10, such as the tower 12, rotor blades 22, or any other components of the wind turbine 10. For example, the traction apparatus 106 may be a suction or vacuum apparatus that provides a suction, vacuum, or negative pressure force between the climbing device 102 and the wind turbine 10 component that the climbing device 102 is traversing, such as the tower 12. Alternatively, the traction apparatus 106 may be a magnet apparatus or other traction apparatus that supplies and maintains traction between the climbing device 102 and the wind turbine 10 component that the climbing device 102 is traversing.

The climbing device 102 may further include a drive mechanism 108. The drive mechanism 108 may be configured to drive the climbing device 102. For example, the drive mechanism 108 may be coupled to the traction apparatus 106, and may drive the traction apparatus 106, causing the climbing device 102 to traverse the various wind turbine 10 components. Alternatively, the drive mechanism 108 may be independent of the traction apparatus 106, and may independently cause the climbing device 102 to traverse the various wind turbine 10 components. The drive mechanism 108 may be, for example, a direct drive mechanism including a motor, or may include a gearbox, belt, chain, rack and pinion system, or any other suitable drive component.

The climbing device 102 may further include, for example, a power source (not shown), and/or various other suitable components or systems for operating the climbing device 102.

The climbing device 102 may further include a processor 110 for operating the climbing device 102. The climbing device 102, such as the traction apparatus 106, drive mechanism 108, and/or any other components or systems of the climbing device 102, may be communicatively coupled to the processor 110. The communicative coupling of the various components of the climbing device 102 and the processor 110 may be through a physical coupling, such as through a wire or other conduit or umbilical cord, or may be a wireless coupling, such as through an infra-red, cellular, sonic, optical, or radio frequency based coupling. The processor 110 may be incorporated into a suitable control system (not shown), such as a handheld remote, a personal digital assistant, cellular telephone, a separate pendant controller, or a computer. The climbing device 102 may be operated manually through the processor 110 by a human operator, or may be partially or fully automated through the use of suitable programming logic incorporated into the processor 110.

One example of a suitable climbing device 102 is the climber manufactured by INTERNATIONAL CLIMBING MACHINES. The climbing device 102 of the present disclosure may traverse the wind turbine 10, such as the tower 12 or any other wind turbine 10 component, such as a rotor blade 22, as desired to allow the inspection device 104 to inspect the wind turbine 10 for indications 50.

The inspection device 104 may be connected to the climbing device 102, and may be configured to inspect the wind turbine 10, such as the rotor blades 22 or any other wind turbine 10 components, such as the tower 12, for indications 50. For example, in an exemplary embodiment, the inspection system 100 may be provided to the tower 12, such that the climbing device 102 traverses the tower 12, and the inspection system 100 may be operated to inspect a rotor blade 22 for indications 50. The climbing device 102 may be operated to traverse the tower 12 as desired or required for inspection of the rotor blade 22, while the inspection device 104 may be operated to inspect the rotor blade 22 for indications 50, as discussed below.

The inspection device 104 of the present disclosure may include any variety of components or systems for inspecting the wind turbine 10. For example, the inspection device 104 may, in exemplary embodiments, include a variety of apparatus configured to inspect the rotor blades 22.

In an exemplary embodiment, the inspection device 104 may include, for example, a measuring apparatus 120. The measuring apparatus 120 may be configured to measure the size of any indications 50 detected on the wind turbine 10, such as on a rotor blade 22. For example, the measuring apparatus 120 may include at least one laser 122 or a plurality of lasers 122. The lasers 122 may be directed at or proximate to indications 50 detected on the wind turbine 10, and may be utilized to measure the size of the indications 50. In an exemplary embodiment, the measuring apparatus 120 may include two lasers 122 disposed approximately parallel to each other. The lasers 122 may be calibrated such that the distance between the endpoints 124 of the lasers 122 is known. The lasers 122 may then be utilized to measure the size of the indications 50 by directing the lasers 122 at or proximate to the indications 50 and using the known distance between the endpoints 124 to scale and measure the size of the indications 50. The known distance between the endpoints 124 may be documented, such as in images of the indications 50 taken by the inspection device 104 as discussed below, such that the size of the indications 50 may be documented, verified, and recorded during or after the inspection of the wind turbine 10.

It should be understood that any number of lasers 122 may be utilized, and that if more that one laser 122 is utilized, the lasers 122 need not be disposed parallel each other, but may have any orientation relative to each other. Further, it should be understood that the measuring apparatus 120 need not include lasers 122, but rather may include any suitable measuring devices, such as any variety of light sources or indicators.

The measuring apparatus 120, and various components therein, may further include and be communicatively coupled to a processor 126 for operating the measuring apparatus 120. The communicative coupling of the measuring apparatus 120 and the processor 126 may be through a physical coupling, such as through a wire or other conduit or umbilical cord, or may be a wireless coupling, such as through an infra-red, cellular, sonic, optical, or radio frequency based coupling. The processor 126 may be incorporated into a suitable control system (not shown), such as a handheld remote, a personal digital assistant, cellular telephone, a separate pendant controller, or a computer. The measuring apparatus 120 may be operated manually through the processor 126 by a human operator, or may be partially or fully automated through the use of suitable programming logic incorporated into the processor 126. Further, the processor 126 may include suitable processing apparatus and software for performing the various calculations required by the measuring apparatus 120.

In an exemplary embodiment, the inspection device 104 may include, for example, a locating apparatus 130. The locating apparatus 130 may be configured to determine the location of the indications 50. For example, the locating apparatus 130 may determine the location of an indication 50 detected by the inspection device 104 on the rotor blade 22 by providing information regarding the location of the climbing device 102 on the tower 12 when the indication 50 is detected, and converting this information to information regarding the respective location of the indication 50 along the length of the rotor blade 22.

In one embodiment, for example, the locating apparatus 130 may include a metering device 132. The metering device 132 may be located on the rotatable hub 20, the ground, or on any other wind turbine 10 component. The metering device 132 may be communicatively coupled to the climbing device 102 through a physical coupling, such as through a wire or other conduit or umbilical cord, or through a wireless coupling, such as through an infra-red, cellular, sonic, optical, or radio frequency based coupling. The metering device 132 may indicate the distance that the climbing device 102 is from the rotatable hub 20, the ground, or any other wind turbine 10 component, when the inspection device 104 detects an indication 50. This distance may be utilized with other data, such as the height of the tower 12 and the length of the rotor blade 22, to calculate the location of the indication 50 along the length of the rotor blade 22.

In another embodiment, the locating apparatus 130 may include a global positioning system ("GPS") device 134. The GPS device 134 may, in one embodiment, comprise at least one location transmitter 135 and a receiver 136. In an exemplary embodiment, the GPS device 134 may comprise three location transmitters 135 and a receiver 136. The location transmitters 135 may be placed on the ground or on the tower 12 or another wind turbine 10 component, and the receiver 136 may be located on the climbing device 102. The location transmitters 135 may receive location data through GPS technology, as is known in the art, and may transmit this data to the receiver 136. The receiver 136 may utilize this location data to determine the location of the climbing device 102 on the tower 12, when the inspection device 104 detects an indication 50, and this location may be utilized with other data, such as the height of the tower 12 and the length of the rotor blade 22, to calculate the location of the indication 50 along the length of the rotor blade 22.

Alternatively, the GPS device 134 may comprise a transmitter 135 located on the climbing device 102. The location transmitter 135 may receive location data through GPS technology, as is known in the art, and this data may be utilized with other data, such as the height of the tower 12 and the length of the rotor blade 22, to calculate the location of the indication 50 along the length of the rotor blade 22.

The location data obtained from the location apparatus 130 may be documented, such as recorded on images of the indications 50 taken by the inspection device 104 as discussed below, such that the locations of the indications 50 on the rotor blade 22 or other wind turbine 10 components may be documented, verified, and recorded during or after the inspection of the wind turbine 10.

The locating apparatus 130, and various components therein, may further include and be communicatively coupled to a processor 138 for operating the locating apparatus 130. The communicative coupling of the locating apparatus 130 and the processor 138 may be through a physical coupling, such as through a wire or other conduit or umbilical cord, or may be a wireless coupling, such as through an infra-red, cellular, sonic, optical, or radio frequency based coupling. The processor 138 may be incorporated into a suitable control system (not shown), such as a handheld remote, a personal digital assistant, cellular telephone, a separate pendant controller, or a computer. The locating apparatus 130 may be operated manually through the processor 138 by a human operator, or may be partially or fully automated through the use of suitable programming logic incorporated into the processor 138. Further, the processor 138 may include suitable processing apparatus and software for performing the various calculations required by the locating apparatus 130.

In an exemplary embodiment, the inspection device 104 may include, for example, a real time imaging apparatus 140. The real time imaging apparatus 140 may be configured to provide a real time image of the indications 50. For example, the real time imaging apparatus 140 may include a camera 142, such as a video camera, digital camera, analog camera, or other suitable imaging device. The camera 142 may be communicatively coupled to a receiver 144 through a physical coupling, such as through a wire or other conduit or umbilical cord, or through a wireless coupling, such as through an infra-red, cellular, sonic, optical, or radio frequency based coupling. The receiver 144 may be, for example, a computer, television, or other suitable screen, monitor, or device for displaying a picture or video. As the climbing device 102 traverses the wind turbine 10, the camera 142 may provide real time images of the areas of the wind turbine 10, such as the portions of the rotor blade 22, being inspected. These real time images may be provided to the receiver 144, and may be viewed by human operators of the inspection system 100 and/or recorded. The real time images may be utilized by the human operators, or alternatively by detection software as discussed below, to detect indications 50.

The real time imaging apparatus 140, and various components therein, may further include and be communicatively coupled to a processor 146 for operating the real time imaging apparatus 140. The communicative coupling of the real time imaging apparatus 140 and the processor 146 may be through a physical coupling, such as through a wire or other conduit or umbilical cord, or may be a wireless coupling, such as through an infra-red, cellular, sonic, optical, or radio frequency based coupling. The processor 146 may be incorporated into a suitable control system (not shown), such as a handheld remote, a personal digital assistant, cellular telephone, a separate pendant controller, or a computer. The real time imaging apparatus 140 may be operated manually through the processor 146 by a human operator, or may be partially or fully automated through the use of suitable programming logic incorporated into the processor 146.

In an exemplary embodiment, the inspection device 104 may include, for example, a rasterization apparatus 150. The rasterization apparatus 150 may be configured to rasterize the wind turbine 10, such as the wind turbine 10 component being inspected, such as the rotor blade 22. For example, the rasterization apparatus 150 may be configured to capture images of the area of the wind turbine 10 being inspected and rasterize these images.

In an exemplary embodiment, the rasterization apparatus 150 may utilize the camera 142 to capture images of the area of the wind turbine 10 being inspected. Alternatively, the rasterization apparatus 150 may utilize a separate camera or other imaging device. The camera 142 or other camera or imaging device may be communicatively coupled to rasterization software 154 for rasterizing images of the area of the wind turbine 10 being inspected, such as the rotor blade 22. Any suitable rasterization software, such as any software that inputs images and outputs raster images or grids, may be utilized in rasterization apparatus 150. One example of suitable rasterization software 154 is RASTERVECT by RASTERVECT SOFTWARE.

The rasterization apparatus 150, and various components therein, may further include and be communicatively coupled to a processor 156 for operating the rasterization apparatus 150. The communicative coupling of the rasterization apparatus 150 and the processor 156 may be through a physical coupling, such as through a wire or other conduit or umbilical cord, or may be a wireless coupling, such as through an infra-red, cellular, sonic, optical, or radio frequency based coupling. The processor 156 may be incorporated into a suitable control system (not shown), such as a handheld remote, a personal digital assistant, cellular telephone, a separate pendant controller, or a computer. The rasterization apparatus 150 may be operated manually through the processor 156 by a human operator, or may be partially or fully automated through the use of suitable programming logic incorporated into the processor 156.

In exemplary embodiments, the rasterization apparatus 150 may be communicatively coupled to the climbing device 102, such that the rasterization apparatus 150 may control or direct the pattern in which the climbing device 102 traverses the wind turbine 10, such as the tower 12, for inspection of the wind turbine 10, such as the rotor blade 22. For example, in one exemplary embodiment, the rasterization apparatus 150 may require that the climbing device 102 traverse the tower 12 in a pattern such that the rasterization apparatus 150 begins documenting the suction side or the pressure side of a rotor blade 22 at the tip of the rotor blade 22, and then continues generally through the length of the rotor blade 22 to the hub of the rotor blade 22, recording at least a portion of the width of the rotor blade 22, and then continues back towards the tip by traveling through a point that defines the maximum chord width of the rotor blade 22, recording the remainder of the width of the rotor blade 22. In other embodiments, however, the rasterization apparatus 150 may document any portion of the rotor blade 22 utilizing any pattern known in the rasterization art, including straight, curved, or zig-zig patterns.

In an exemplary embodiment, the inspection device 104 may include, for example, an imaging analysis apparatus 160. The imaging analysis apparatus 160 may be configured to capture images of the indications 50 and enhance the images of the indications 50. For example, the imaging analysis apparatus 160 may utilize the camera 142, or a separate camera or other imaging device, to capture images of indications 50 found during inspection of the wind turbine 10. The camera 142 or other camera or imaging device may be communicatively coupled to imaging analysis software 164 for enhancing the images. For example, the imaging analysis software 164 may be configured to lighten, darken, change the contrast, resolution, or color, magnify, or perform any variety of enhancements to the image, as is known in the art. Alternatively, the camera 142 or other camera or imaging device may capture a variety of images of each indication 50, and the images may be captured at various resolutions, contrasts, lightings, colors, and other adjustable imaging characteristics. The imaging analysis software 164 may be configured to combine the images to produce a suitable detailed image of the indication 50. One example of suitable imaging analysis software 164 is ADOBE PHOTOSHOP by ADOBE SYSTEMS INC.

In some exemplary embodiments, the imaging analysis apparatus 160 may be further configured to automatically detect the indications 50. For example, the camera 142 or other camera or imaging device may be communicatively coupled to machine vision software 166 for automatically detecting the indications 50. The machine vision software 166 may monitor the images being communicated through the camera 142 or other camera or imaging device, and may recognize indications 50 in the images. One example of suitable machine vision software 166 is ROBOREALM robotic machine vision software by ROBOREALM. The machine vision software 166, imaging analysis software 164, and camera 142 or other camera or suitable imaging device may further be communicatively coupled such that the machine vision software 166 is capable of directing the enhancement of images of indications 50 that are automatically detected.

In one embodiment, the imaging analysis apparatus 160, such as the machine vision software 166, may detect and utilize the contrast between various areas on the wind turbine 10 component being analyzed, such as between various areas on a rotor blade 22, to automatically detect the indications 50. For example, indications 50 on the wind turbine 10 component being analyzed may be discolored, or may reflect light differently, than the remainder of the wind turbine 10 component. Thus, there will be a contrast in the color and/or light reflected from the wind turbine 10 component in the area of the indication 50, and the imaging analysis apparatus may detect and utilize this resulting contrast gradient. Additionally, the imaging analysis apparatus 160 may detect the duration of a contrast gradient when the inspection device 104 is inspecting the wind turbine 10, and utilize this duration to calculate the size of the indication 50. Further, contrast gradients may be utilized by the imaging analysis apparatus 160 to detect the outline, or silhouette, of the wind turbine 10 component being analyzed.

The imaging analysis apparatus 160, such as the machine vision software 166, may be communicatively coupled to the climbing device 102. Thus, the machine vision software 166 may be capable of operating the climbing device 102 to traverse the wind turbine 10 while the machine vision software 166 is operating to detect indications 50, and may be capable of operating the climbing device 102 to stop moving when an indication 50 is detected, such that images of the indication 50 may be captured and processed.

The imaging analysis apparatus 160, and various components therein, may further include and be communicatively coupled to a processor 168 for operating the imaging analysis apparatus 160. The communicative coupling of the imaging analysis apparatus 160 and the processor 168 may be through a physical coupling, such as through a wire or other conduit or umbilical cord, or may be a wireless coupling, such as through an infra-red, cellular, sonic, optical, or radio frequency based coupling. The processor 168 may be incorporated into a suitable control system (not shown), such as a handheld remote, a personal digital assistant, cellular telephone, a separate pendant controller, or a computer. The imaging analysis apparatus 160 may be operated manually through the processor 168 by a human operator, or may be partially or fully automated through the use of suitable programming logic incorporated into the processor 168.

In an exemplary embodiment, the inspection system 100 of the present disclosure may include a safety device 170. The safety device 170 may connect the inspection system 100 to the wind turbine 10. For example, the safety device 170 may be connected at one end to the climbing device 102. Alternatively, the safety device may be connected to, for example, any component of the inspection device 104, such as the measuring apparatus 120 or the locating apparatus 130. The safety device 170 may further be connected at another end to the nacelle 16. Alternatively, the safety device 170 may be connected, for example, any component of the wind turbine 10, such as the tower 12. In the event that the climbing device 102, while traversing the wind turbine 10, loses traction and becomes disengaged from the wind turbine 10, the safety device 170 may prevent the climbing device 102 from falling to the ground and becoming damaged or broken.

In further exemplary embodiments, the safety device 170 may be configured to reduce the apparent weight of the inspection system 100. For example, the safety device 170 may include, for example a tensioning system, such as a spring tensioning system, or a counterweight for offsetting the weight of the inspection system 100. Further, the tensioning system or counterweight may, in some embodiments, increase the force applied to offset the weight of the inspection system 100 as the inspection system 100 moves up the wind turbine 10, to offset the weight of any wires, conduits, or umbilical cords that are associated with the inspection system 100. For example, in one exemplary embodiment, the safety device 170 may include a spring balancer 172. The spring balancer 172 may include a spring tensioning system for offsetting the weight of the inspection system 100. Alternatively, however, the safety device 170 may include a rope and pulley system, an elastic or bungle cord, a winch driven by an electric, hydraulic, pneumatic, or other power source, any lighter-than-air device such as a helium balloon, or any other suitable mechanical device or force inducer. It should be understood that the safety device 170 of the present disclosure is not limited to the above examples, but may be any device suitable for preventing the inspection system 100 from falling to the ground and/or offsetting the weight of the inspection system 100.

The safety device 170, and various components therein, may further include and be communicatively coupled to a processor 174 for operating the safety device 170. The communicative coupling of the safety device 170 and the processor 174 may be through a physical coupling, such as through a wire or other conduit or umbilical cord, or may be a wireless coupling, such as through an infra-red, cellular, sonic, optical, or radio frequency based coupling. The processor 174 may be incorporated into a suitable control system (not shown), such as a handheld remote, a personal digital assistant, cellular telephone, a separate pendant controller, or a computer. The safety device 170 may be operated manually through the processor 174 by a human operator, or may be partially or fully automated through the use of suitable programming logic incorporated into the processor 174.

In exemplary embodiments, the inspection system 100 of the present disclosure may include a light source 180. The light source 180 may be configured to expose indications 50. For example, the light source 180 may allow the inspection system 100 to operate at night, or during cloudy or inclement weather. Further, the light source 180 may be operated to create favorable lighting conditions, such as incident lighting, to enable relatively high contrast inspection of indications 50. For example, the light source 180 may be directed at indications 50 at angles suitable to exaggerate the view of the indications 50 by the inspection system 100. The light source 180 may be disposed on the inspection system 100, such as on the climbing device 102. Alternatively, the light source 180 may be disposed on the wind turbine 10, such as on the tower 12, the hub 20, or at any other suitable location on the wind turbine 10, or on the ground.

The light source 180, and various components therein, may further include and be communicatively coupled to a processor 182 for operating the light source 180. The communicative coupling of the light source 180 and the processor 182 may be through a physical coupling, such as through a wire or other conduit or umbilical cord, or may be a wireless coupling, such as through an infra-red, cellular, sonic, optical, or radio frequency based coupling. The processor 182 may be incorporated into a suitable control system (not shown), such as a handheld remote, a personal digital assistant, cellular telephone, a separate pendant controller, or a computer. The light source 180 may be operated manually through the processor 182 by a human operator, or may be partially or fully automated through the use of suitable programming logic incorporated into the processor 182.

It should be understood that the various processors may be separate processors, or may combined to form a processor or processors capable of performing various of the functions and inspection tasks required by the inspection system 100.

The present disclosure is further directed to a method for inspecting a wind turbine 10 for indications 50. The method may include, for example, the steps of providing an inspection system 100 on the wind turbine 10, operating the inspection system 100 to traverse the wind turbine 10, and operating the inspection system 100 to inspect the wind turbine 10 for indications 50. As discussed above, the wind turbine 10 of the present disclosure may include a tower 12 and at least one rotor blade 22. In exemplary embodiments, the inspection system 100 may be provided to the tower 12, may be operated to traverse the tower 12, and may be operated to inspect the at least one rotor blade 22 for indications 50.

For example, an inspection system 100 may be provided on the wind turbine 10, such as on the tower 12, or alternatively on a rotor blade 22 or other wind turbine 10 component. As discussed above, the inspection system 100 may include a climbing device 102, a safety device 170, and an inspection device 104. The climbing device 102 may be configured to traverse the wind turbine 10, such as the tower 12, rotor blade 22, or other wind turbine 10 component, as discussed above.

The inspection system 100 of the present disclosure, such as the inspection device 104, may be operated to inspect the wind turbine 10, such as the rotor blade 22, or alternatively the tower 12 or other wind turbine 10 component, for indications 50. For example, in exemplary embodiments, operating the inspection system 100 to inspect the wind turbine 10 for indications 50 may comprise measuring the size of the indications 50. For example, the inspection device 104 of the inspection system 100 may include a measuring apparatus 120. The measuring apparatus 120 may be configured to measure the size of indications 50 detected by the inspection device 104, as discussed above. Further, measuring the size of the indications 50 may comprise, for example, providing at least one measuring apparatus 120 in the inspection system 104, calibrating the measuring apparatus 120, and utilizing the measuring apparatus 120 to measure the size of the indications 50, as discussed above.

In exemplary embodiments, operating the inspection system 100 to inspect the wind turbine 10 for indications 50 may comprise determining the location of the indications 50. For example, the inspection device 104 of the inspection system 100 may include a locating apparatus 130. The locating apparatus 130 may be configured to determine the location of indications 50 detected by the inspection device 104, as discussed above.

In exemplary embodiments, operating the inspection system 100 to inspect the wind turbine 10 for indications 50 may comprise providing a real time image of the indications 50. For example, the inspection device 104 of the inspection system 100 may include a real time imaging apparatus 140. The real time imaging apparatus 140 may be configured to provide a real time image of the indications 50, as discussed above.

In exemplary embodiments, operating the inspection system 100 to inspect the wind turbine 10 for indications 50 may comprise rasterizing the wind turbine 10. For example, the inspection device 104 of the inspection system 100 may include a rasterization apparatus 150. The rasterization apparatus 150 may be configured to rasterize the wind turbine 10, such as the rotor blade 22, or alternatively the tower 12 or any other wind turbine 10 component, as discussed above.

In exemplary embodiments, operating the inspection system 100 to inspect the wind turbine 10 for indications 50 may comprise capturing images of the indications 50 and enhancing the images of the indications 50. In further exemplary embodiments, operating the inspection system 100 to inspect the wind turbine 10 for indications 50 may comprise automatically detecting the indications 50. For example, the inspection device 104 of the inspection system 100 may include an imaging analysis apparatus 160. The imaging analysis apparatus 160 may be configured to capture images of indications 50 and enhance the images of the indications 50, and may further be configured to automatically detect the indications 50, as discussed above.

In exemplary embodiments, the method may include the step of operating the safety device 170 to reduce the apparent weight of the inspection system 100. For example, the safety device 170 may include a tensioning system or counterweight for offsetting the weight of the inspection system 100, as discussed above. In some embodiments, the safety device 170, including the tensioning system or counterweight, may operate automatically to reduce the apparent weight of the inspection system 100 when necessary. Alternatively, the safety device 170 may be operated manually or automatically through the processor 174 to reduce the apparent weight of the inspection system 100 as desired.

In further exemplary embodiments, the method of the present disclosure may include various steps involving positioning the rotor blade 22 for inspection by the inspection system. For example, the method may include the step of rotating the rotor blade 22 such that the rotor blade 22 is approximately parallel to and proximate the tower. For example, the rotor blade 22 may be rotated about the axis of rotation until the rotor blade 22 is in a generally downward position. The rotor blade 22 may then be rotated and positioned such that it is approximately parallel to the tower 12. Thus, the inspection system 100 disposed on the wind turbine 10, such as on the tower 12, may be in an optimal position for inspecting the rotor blade 22.

The method may further include the step of rotating the nacelle 16 about the yaw axis 38. For example, while the inspection system 100 of the present disclosure may advantageously inspect a wind turbine 10 in a wide variety of environmental conditions, the use of incident light to inspect the wind turbine 10 may still be beneficial. Thus, if incident light is available, or if other desired conditions are present, the nacelle 16 may be rotated about the yaw axis 38 to optimally position the rotor blades 22 as desired.

The method may further include the step of rotating the rotor blade 22 about the pitch axis 34. For example, a rotor blade 22 of the present disclosure may include a pressure side, a suction side, a leading edge, and a trailing edge, as is known in the art. Each side and edge of the rotor blade 22 must be inspected. To be inspected by the inspection system 100, the side or edge must be in the line-of-sight of the inspection system 100. For example, when the rotor blade 22 is positioned such that the pressure side, leading edge, and trailing edge are in the line-of-sight of the inspection system 100 disposed on the tower 12, the suction side may not be analyzed. Thus, during the inspection of the rotor blade 22 by the inspection system 100, after analyzing portions of the rotor blade 22 that are in the line-of-sight of the inspection system 100, the rotor blade 22 may be rotated about the pitch axis 34 such that other portions of the rotor blade 22 are placed in the line-of-sight of the inspection system 100. The inspection system 100 may then continue to inspect the rotor blade 22.

In exemplary embodiments, operating the inspection system 100 to inspect the wind turbine 10 for indications 50 may comprise operating a light source 180 to expose indications 50. For example, the inspection system 100 may include a light source 180. The light source 180 may be configured to expose indications 50, as discussed above.

It should be understood that the inspection system and method of the present disclosure may be optimized for fast, efficient inspection of a wind turbine 10. For example, the inspection system and method of the present disclosure may be utilized to quickly and efficiently inspect the various rotor blades 22 of a wind turbine 10. Additionally, it should be understood that the inspection system and method of the present disclosure eliminate or reduce human errors previously associated with the inspection of wind turbines 10. Further, it should be understood that the inspection system and method of the present disclosure can perform in a wide variety of environmental conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for inspecting a wind turbine for indications, the method comprising:
   providing an inspection system on a tower of the wind turbine, the inspection system including a climbing device and an inspection device, the climbing device including a traction apparatus configured to engage the tower and a drive mechanism configured to drive the climbing device on the tower;
   rotating a rotor blade of the wind turbine such that the rotor blade is approximately parallel to and proximate the tower;
   operating the inspection system to traverse the tower; and,
   operating the inspection system to inspect the rotor blade for indications.

2. The method of claim 1, further comprising operating a safety device to reduce the apparent weight of the inspection system.

3. The method of claim 1, further comprising rotating the rotor blade about a pitch axis.

4. The method of claim 1, wherein operating the inspection system to inspect the wind turbine for indications comprises measuring the size of the indications.

5. The method of claim 4, wherein measuring the size of the indications comprises providing at least one measuring apparatus in the inspection system, calibrating the measuring apparatus, and utilizing the measuring apparatus to measure the size of the indications.

6. The method of claim 1, wherein operating the inspection system to inspect the wind turbine for indications comprises determining the location of the indications.

7. The method of claim 1, wherein operating the inspection system to inspect the wind turbine for indications comprises rasterizing the wind turbine.

8. The method of claim 1, wherein operating the inspection system to inspect the wind turbine for indications comprises capturing images of the indications and enhancing the images of the indications.

9. The method of claim 8, wherein operating the inspection system to inspect the wind turbine for indications includes automatically detecting the indications.

10. The method of claim 1, wherein operating the inspection system to inspect the wind turbine for indications comprises providing a real time image of the indications.

11. An inspection system for inspecting a wind turbine for indications, the inspection system comprising:
    a climbing device configured to traverse a tower of the wind turbine, the climbing device including a traction apparatus configured to engage the tower and a drive mechanism configured to drive the climbing device on the tower; and,
    an inspection device connected to the climbing device and configured to inspect a rotor blade of the wind turbine for indications.

12. The inspection system of claim 11, further comprising a safety device connecting the inspection system to the wind turbine, the safety device configured to reduce the apparent weight of the inspection system.

13. The inspection system of claim 11, the inspection device including a measuring apparatus configured to measure the size of the indications.

14. The inspection system of claim 13, wherein the measuring apparatus includes at least one laser.

15. The inspection system of claim 13, wherein the measuring apparatus includes two lasers disposed approximately parallel to each other.

16. The inspection system of claim 11, the inspection device including a locating apparatus configured to determine the location of the indications.

17. The inspection system of claim 11, the inspection device including a rasterization apparatus configured to rasterize the wind turbine.

18. The inspection system of claim 11, the inspection device including an imaging analysis apparatus configured to capture images of the indications and enhance the images of the indications.

19. The inspection system of claim 18, wherein the imaging analysis apparatus is further configured to automatically detect the indications.

20. The inspection system of claim 11, the inspection device including a real time imaging apparatus configured to provide a real time image of the indications.

* * * * *